United States Patent [19]

Miller, II et al.

[11] Patent Number: 5,406,615
[45] Date of Patent: Apr. 11, 1995

[54] MULTI-BAND WIRELESS RADIOTELEPHONE OPERATIVE IN A PLURALITY OF AIR INTERFACE OF DIFFERING WIRELESS COMMUNICATIONS SYSTEMS

[75] Inventors: Robert R. Miller, II, Morris Township, Morris County; B. Waring Partridge, III, Mendham; Jesse E. Russell, Piscataway; Robert E. Schroeder, Morris Township, Morris County, all of N.J.

[73] Assignee: AT&T Corp., Murray Hill, N.J.

[21] Appl. No.: 102,037

[22] Filed: Aug. 4, 1993

[51] Int. Cl.$^6$ .............. H04M 11/00; H04Q 7/00
[52] U.S. Cl. .................. 379/59; 379/61; 379/60; 455/33.1; 455/33.2
[58] Field of Search .............. 455/33.1, 33.2, 56.1; 379/58, 59, 60, 61, 63; 343/749, 722, 815, 702

[56] References Cited

U.S. PATENT DOCUMENTS 4,972,455 11/1990 Phillips .
4,989,230 1/1991 Gillig et al. .................... 379/59
5,260,988 11/1993 Schellinger et al. ............. 379/59

Primary Examiner—Curtis Kuntz
Assistant Examiner—Michael B. Chernoff
Attorney, Agent, or Firm—Alfred G. Steinmetz

[57] ABSTRACT

A universal wireless radiotelephone communication apparatus is operative in both a first radiotelephone communication system including a first base station having a wide area of coverage, transmitting radiotelephone signals at a first band of frequencies and in a second radiotelephone communication system including a second base station having a localized area of coverage, transmitting radiotelephone signals at a second band of frequencies higher than said first band of frequencies. The second band of frequencies is optimally selected with an offset of less than twice a frequency contained within said first band. The wireless radiotelephone communication apparatus has a common baseband circuitry for operating with both the first base station covering the wide area and with the second base station covering the local area. The common baseband circuitry processing received radiotelephone signals from both base stations and processes signals generated by a user of the handset for transmission to either of these base stations.

18 Claims, 13 Drawing Sheets

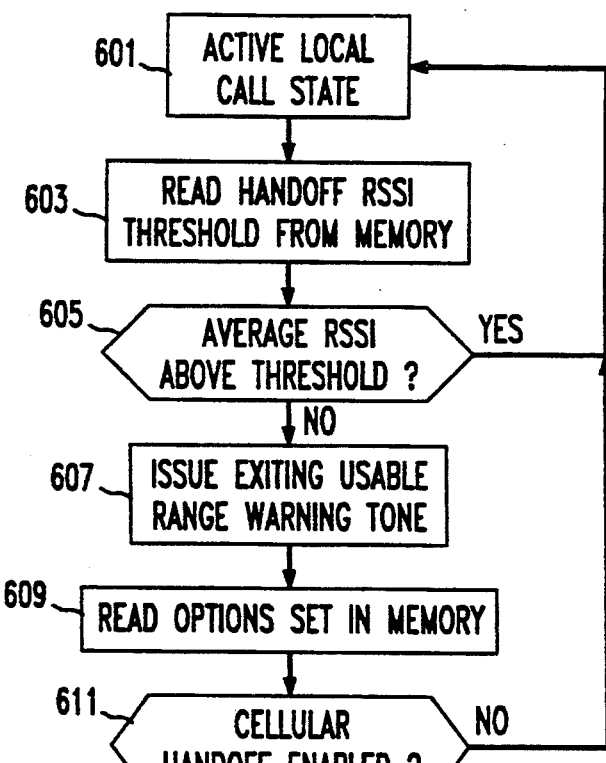
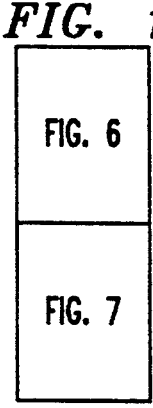
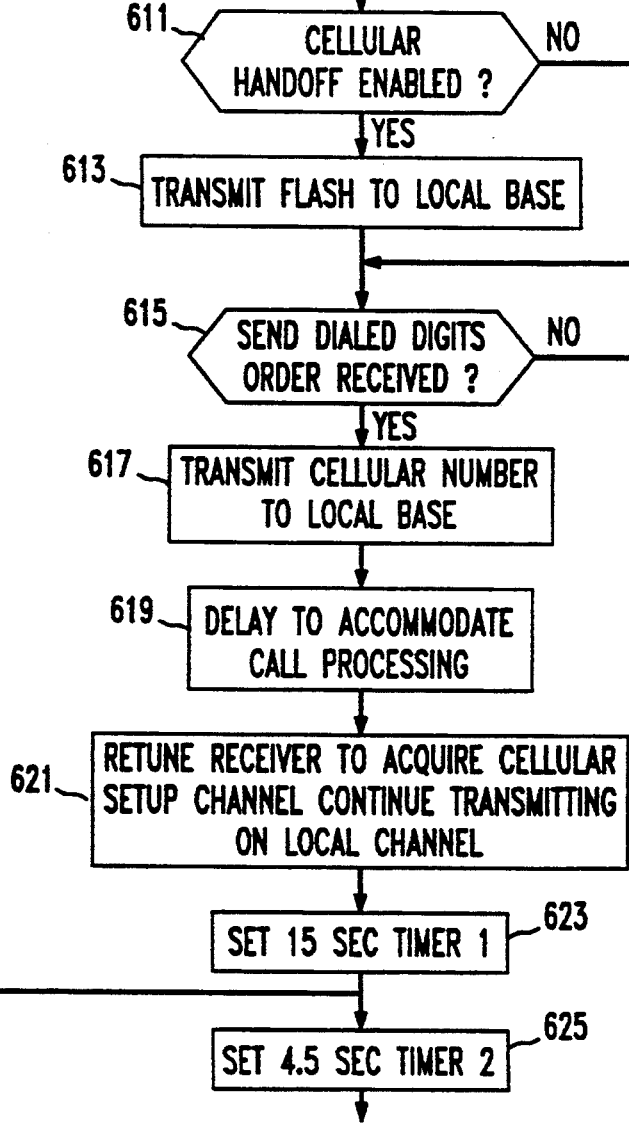
FIG. 6
FIG. 10

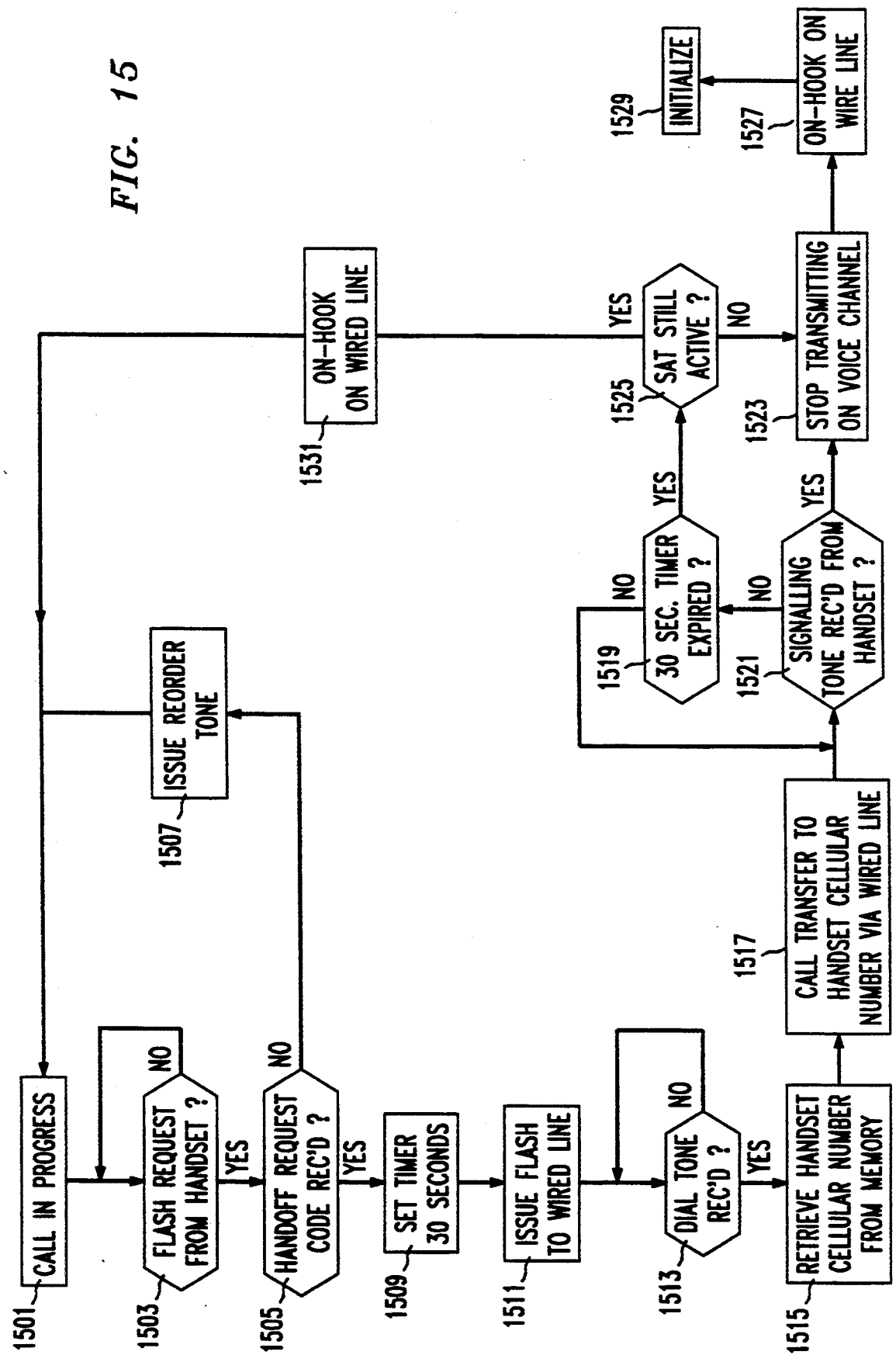

MULTI-BAND WIRELESS RADIOTELEPHONE OPERATIVE IN A PLURALITY OF AIR INTERFACE OF DIFFERING WIRELESS COMMUNICATIONS SYSTEMS

FIELD OF THE INVENTION

This invention relates to wireless radiotelephones and to a universal wireless communication system with a plurality of air interfaces in which a single radiotelephone radio handset is operative.

BACKGROUND OF THE INVENTION

Radiotelephones are used in a variety of wireless communication systems all having different air interface requirements. These various air interface systems include cellular radiotelephone systems, cordless telephone systems and other numerous wireless telephone system arrangements including Personal Communication Networks (PCN) and services. All these arrangements require a radiotelephone handset designed to operate in the air interface system unique to that particular communication system. A radiotelephone handset is generally capable of operating in only one environment (i.e. cellular, cordless, etc). Hence to provide ubiquitous services and to operate across systems with varied air interfaces requires a different radiotelephone handset for each system.

Prior approaches to extend the use of a radiotelephone handset into more than one wireless communication system have included the joining of two separate radiotelephone handset units, each one operative in each and only one of the available wireless communication systems, into one unitary package. Only one of these independent units is operative, however, at one time. Operation in the different air interfaces is accomplished by switching from one unit to the other independent unit as desired. Such an arrangement is described in the U.S. Pat. No. 4,989,230 which discloses a cellular cordless telephone in which separate cellular and cordless transceivers are joined together in a single package. Each transceiver is connected to its air interface by way of its own individual antenna.

SUMMARY OF THE INVENTION

A universal wireless radiotelephone communication apparatus is operative in both a first radiotelephone communication system including a first base station having a wide geographical area of coverage, transmitting radiotelephone signals at a first band of frequencies and in a second radiotelephone communication system including a second base station having a localized short distance area of coverage, transmitting radiotelephone signals at a second band of frequencies higher than said first band of frequencies. The second band of frequencies can be optimally selected with an appropriate offset of less than twice a frequency contained within said first band.

The wireless radiotelephone communication apparatus has a common baseband circuitry for operating with both the first base station covering the wide area and with the second base station covering the local area. The common baseband circuitry processing received radiotelephone signals from both base stations and processes signals generated by a user of the handset for transmission to either of these base stations.

An illustrative wireless radiotelephone communication apparatus is operative in both a first radiotelephone communication system including a first base station having a wide area of coverage, with a plurality of services and functionalities, and transmitting and receiving radiotelephone signals within a first band of frequencies and in a second radiotelephone communication system including a second base station having a localized area of coverage, with localized services and functionalities, and transmitting radiotelephone signals within a second band of frequencies higher than said first band of frequencies. The second band of frequencies is optimally selected with an offset of less than twice a frequency contained within said first band of frequencies and preferably within a frequency band actually contiguous with the upper range of the first band of frequencies. The second base station receives radiotelephone signals within a third band of frequencies at magnitudes typically three times the first band of frequencies.

An illustrative wireless radiotelephone communication mobile subscriber apparatus (e.g. a handset) has a common baseband circuitry having a functionality, which is extendible across the first and second radiotelephone communication systems, for operating with both the first base station covering the wide area and with the second base station covering the local area. The common baseband circuitry processes received radiotelephone signals, within the first and second bands of frequencies, from both base stations and processes signals generated by a user of the radiotelephone handset for transmission within the first and third band of frequencies to either of these base stations.

The radiotelephone handset, in an illustrative embodiment according to the invention, includes minimized first and second RF circuits each dedicated to communication with the first and second base stations. The first RF circuit conditions signals for transmission within the first band of frequencies for transmission to the first base station. The first RF circuit also operates with a second band of frequencies above but substantially contiguous with a portion of the first band to receive cordless signals from the second base station. The second RF circuit also conditions signals for transmission within a third band of frequencies having at least a frequency substantially three times a frequency of signal frequencies within the first band of frequencies for transmission to the second base station. The first and second minimized RF circuits are both connected to the common baseband circuitry. The term minimized precisely defines an RF circuit arrangement in the radiotelephone handset that can receive signals from both the wide area base station (e.g. cellular frequencies) and the local area base station (e.g. cordless frequencies) without the need for two independent front end RF circuits and where the handset transmission signals use the same transmitter circuitry except for circuitry needed for multiplying the transmit frequency to substantially three times the frequency of a frequency in the first band of frequency.

All transmission and reception of signals is through a single antenna. An antenna size is selected to optimize it for the reception of signals in the first and second frequency bands for which it has a length that is typically a fraction of the wavelength of a frequency contained within the first and second frequency band. In a particular embodiment an antenna may have an electrical length which is a one quarter wavelength (i.e. $\frac{1}{4}\lambda$) of a frequency within the first band of frequencies and a three quarter wavelength (i.e. ¾λ) of a frequency within the third band of frequencies and which is connected to service both the first and second RF circuits. Filter circuitry selectively interconnects the single antenna to the first and second RF circuits and directs received signals to the appropriate one of the first and second RF circuits capable of handling the frequency of the received or transmitted communication signal.

All transmit power levels in both the first and second bands of operation are continuously monitored and regulated by the wide area cellular and/or local area cordless base station supervisory sub-systems to deliver appropriate effective radiated power levels for proper RF link performance. This insures satisfactory end-to-end communication performance through the single antenna.

BRIEF DESCRIPTION OF THE DRAWING

In the Drawing:

FIGS. 4 through 9 depict flow diagrams detailing operation of the radiotelephone handset of FIG. 3;

FIGS. 10 and 11 are diagrams showing the relation of the individual FIGS. 4 through 9 to each other.

FIGS. 13 to 15 depict flow diagrams detailing the operation of the base station transceiver of FIG. 12.

DETAILED DESCRIPTION

Figure 1:
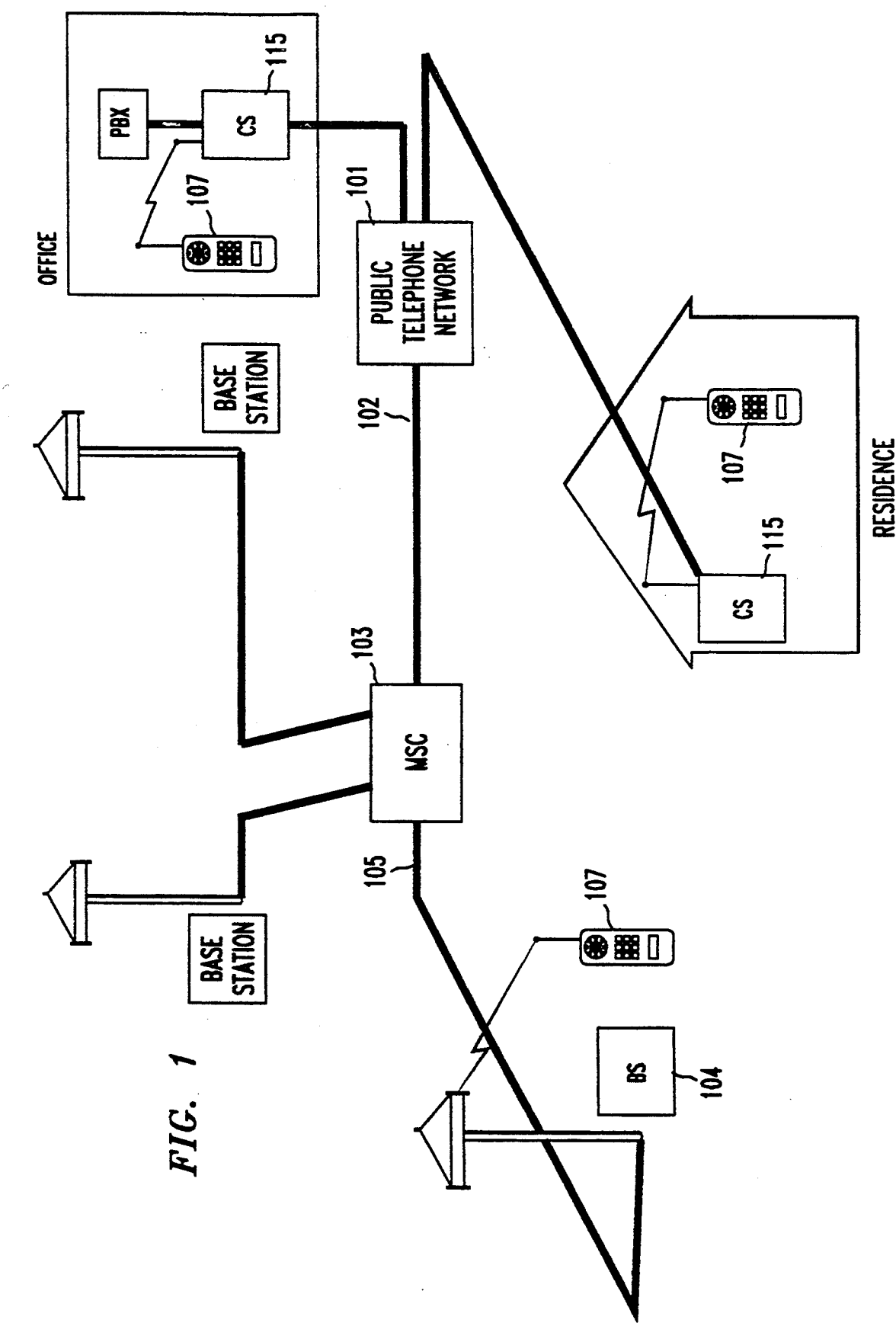
FIG. 1 is a schematic of a wireless telephone system having two distinct air interface systems covering a wide area and a local area respectively.

An arrangement of wireless communication systems may involve a variety of individual air interfaces having differing operating frequencies and characteristics such as diagrammatically shown in the FIG. 1. A public telephone network 101 is shown connected, via a trunk 102, to a mobile switching center (MSC) 103 which serves as the control center for a cellular telephone system. The MSC 103 is connected to a base station (BS) 104, via a trunk 105. BS 104 includes the necessary control and radio transmission and reception equipment to provide supervisory, control and communication channels to a plurality of radiotelephone handsets 107 typically served in the coverage area of the base station. In this scenario a user is using the handset to communicate with the public land telephone network 101 through the cellular telephone network.

Figure 4:
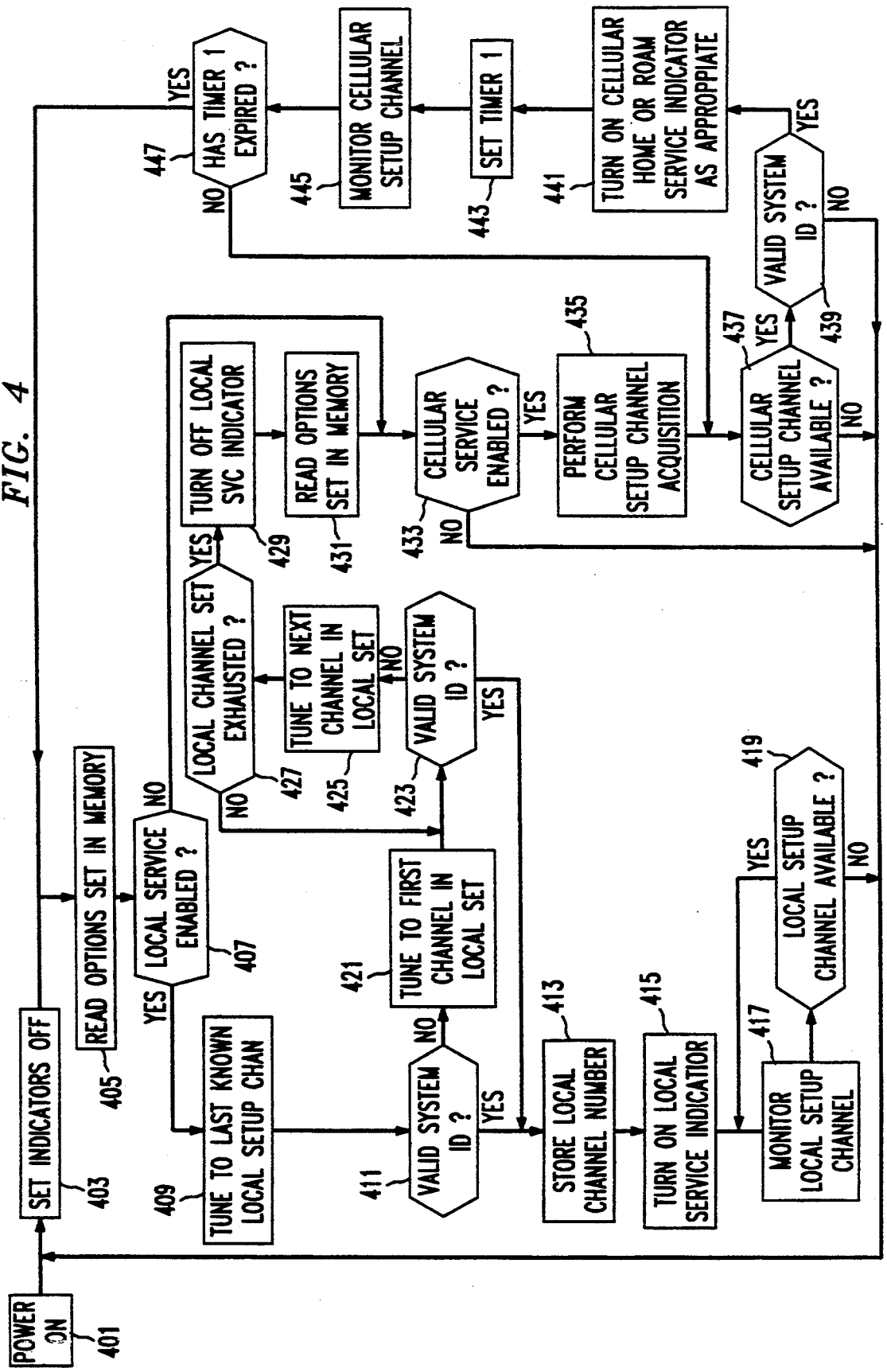

The public telephone network 101 is also connected to a residential local area cordless telephone base station (CS) 115 or in the alternative a PBX or key system included in a business or office structure. A radiotelephone handset 107 is also used to communicate with the public telephone network 101 via the CS 115. In accordance with the invention the two handsets 107 shown in FIG. 1, are identical instruments capable of operating in both cellular and local area radiotelephone service areas. The mode of operation is determined by interactions of the handset 107 with either the BS 104 or the Cs 115, with the supervisory and control channel interactions as shown in FIG. 4 though 9.

The wide serving area of a cellular serving BS 104 generally covers a geographical extent of several square miles; while the local area coverage of the CS 115 is measured in terms of square feet. The air interfaces in the cellular and cordless areas are significantly different. One significant difference is the frequency bands of the radio frequencies used. Normally the typical dedicated radiotelephone handset of the prior art would each be operative in one of the illustrative serving areas and incompatible with and inoperative in the other one of the serving areas. However in accord with the invention the handset 107 is fully operative in both wide area cellular and local area cordless serving areas.

Typically the cellular system uses frequencies in the 800–900 MHz frequency band range (i.e. a FCC licensed frequency range), while cordless systems typically operate at a frequencies close to or within the 46 MHz to 49 MHz frequency range (i.e. an unlicensed frequency range). The wide difference between these frequencies is an inhibiting factor in enabling a single radiotelephone handset unit to function in both cellular and cordless coverage areas. In accordance with the invention, selection of frequencies in combination with a radiotelephone handset platform adapted to utilize these frequencies efficiently, enables a single unit to be operative in both wide area cellular and local area cordless air interfaces.

Figure 2:
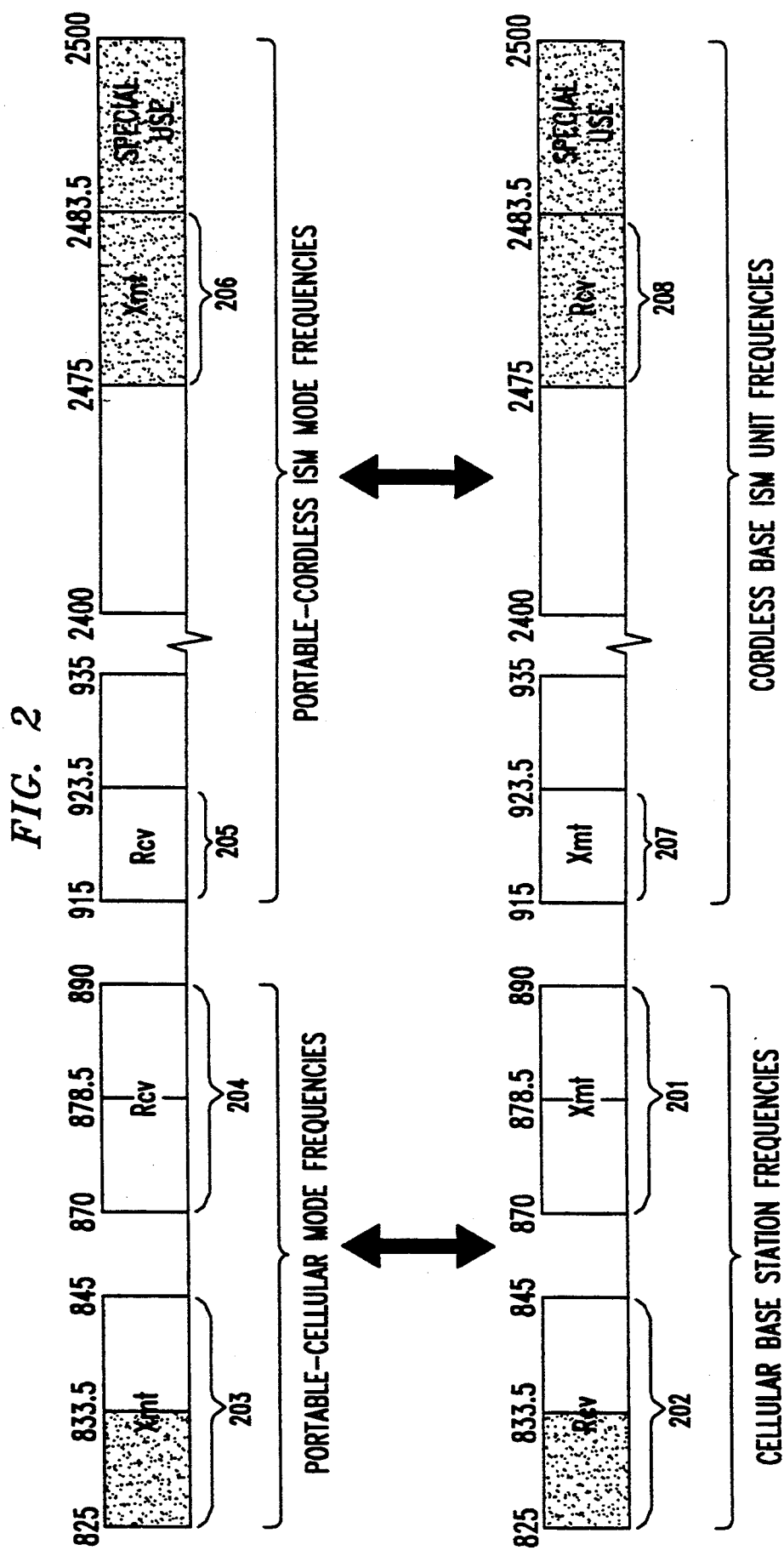
FIG. 2 is a graph of representative frequency spectra which may support the differing air interfaces of the wide and local area.

Suitable illustrative frequency ranges for optimal use with the radiotelephone handset of FIG. 3, operative in both kinds of wireless systems, described below are shown in the frequency graph of FIG. 2. As shown in the graph a typical cellular base station may transmit at a band of frequencies 201 encompassing a range of 870 MHz to 890 MHz and receive communication signals within a band of frequencies 202 from 825 MHz to 845 MHz. The portable radiotelephone handset while operating in a cellular mode would transmit in the frequency band 203 of 825 MHz to 845 MHz. Its receiving band of frequencies 204 in the cellular mode is 870 MHz to 890 MHz.

The local area cordless frequency bands of operation are selected, in accord with the invention, in frequency bands both just above the Cellular band of frequencies and at another higher frequency band significantly different from the present frequency band used by conventional cordless telephone systems. These higher frequency bands are selected from what is designated by the FCC as the Industrial, Scientific, Medical (ISM) frequency bands. As is apparent to those skilled in the art other frequency combinations could be used to address global frequency band requirements without departing from the spirit and scope of the invention.

The illustrative portable radiotelephone handset is operative to receive cordless radiotelephone signals at a first band of frequencies 205 of 915 MHz to 923.5 MHz and transmit radiotelephone signals at a frequency band 206 of 2475 MHz to 2483.5 MHz. This frequency band is within the provisions for unlicensed, non-spread-spectrum ISM band use according to FCC part 15.247. The cordless base station unit is operative to transmit signals at a frequency band 207 from 915 MHZ to 923.5 MHZ and receive signals within the frequency band 208 of 2475 MHZ to 2483.5 MHZ. As shown the frequency ranges 205, 206, 207 and 208 are illustratively all of equal magnitude. These specified frequency bands are illustrative of preferred frequency bands of the invention and are not intended to be limiting. Other frequency selections in accord with the invention will suggest themselves to those skilled in the art. As an example the cordless base station CS can also function using cellular band frequencies if the cellular franchise holder allows such operation.

Figure 3:
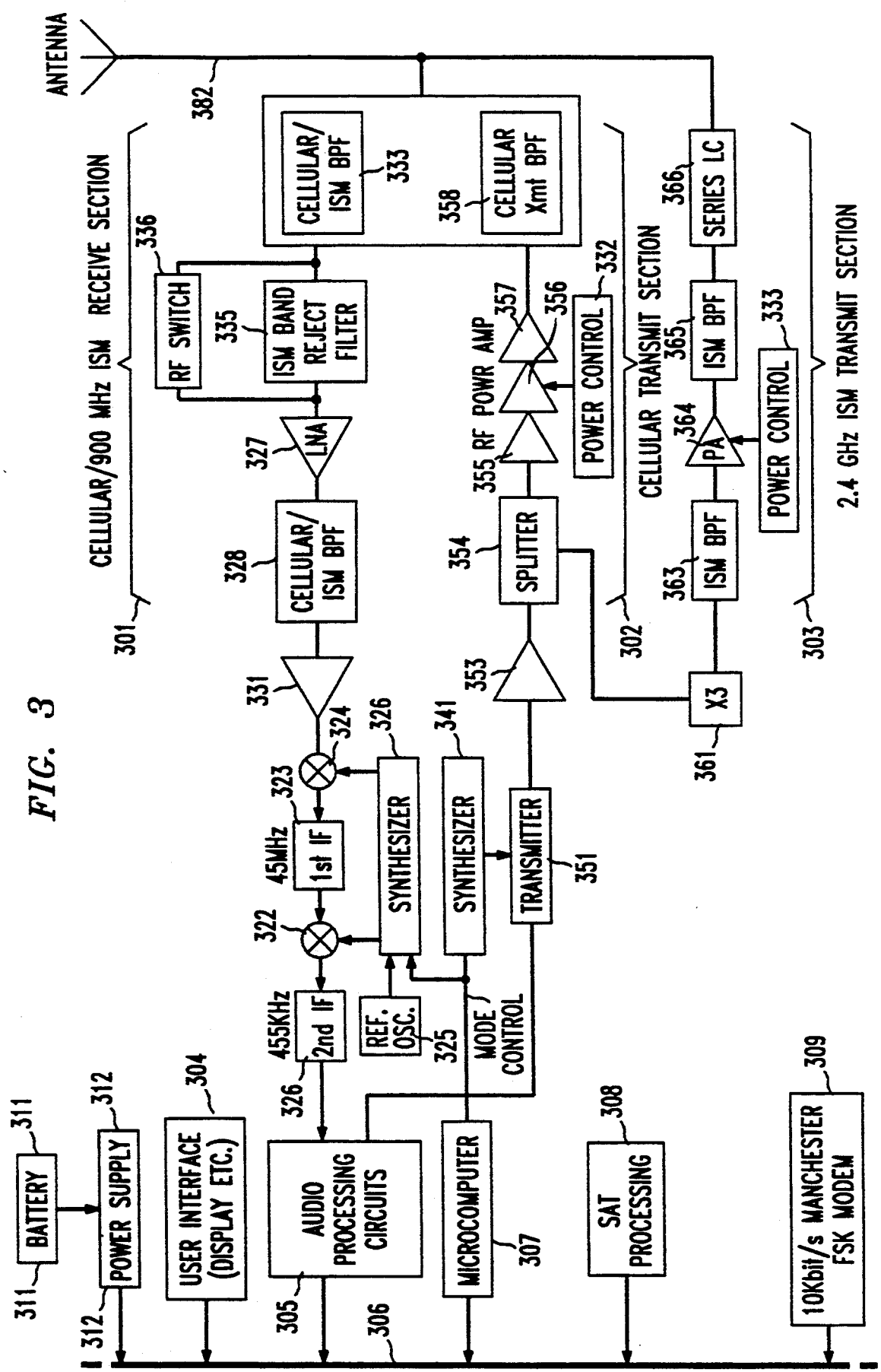
FIG. 3 is a schematic of a mobile radiotelephone handset operative in both air interfaces in the wireless radiotelephone systems depicted in FIGS. 1 and 2.

A radiotelephone handset, constructed to efficiently utilize the above described plurality of radio frequency band spectra in both wide area and local area systems, is shown the schematic of FIG. 3. The radiotelephone handset, shown in block schematic in FIG. 3, includes a cellular receive section (870–890 MHz) and an ISM receive section (915–923.5 MHz) 301; a cellular transmit (825–845 MHz) section 302 and a 2.4 GHz local area ISM transmit (2475–2483 GHz) section 303. The circuits for processing of baseband signals for cellular (wide-area) and cordless (local) operation includes the audio processing circuitry 305, which includes reception, transmitting, input and output circuitry all coupled to an internal control, data, address bus 306. Also connected to the bus 306 are a central processing control comprising a microcomputer 307 a supervisory audio tone (SAT) processing circuit 308 for handling supervisory signals provided from the base stations and a Manchester FSK modem 309 for handling digitally transmitted call set-up and control signals. A user interface and display 304 is provided for, allowing user voice intercom and control input and providing status and operative information to the user, is also connected to the bus 306. Power for the radiotelephone handset is supplied by a battery 311 whose output power is processed a power supply 312.

The audio processing circuitry 305 accepts signals from the output of receiving circuitry which reduces incoming RF frequencies to IF frequencies and subsequently demodulates these signals to produce a baseband signal. The audio processing circuitry 305 is directly connected to a second IF circuit 326 (455 KHz), including an FM detector, which in turn is fed by the output of a mixer 322. Mixer 322 is in turn connected to accept received signals from a first IF circuit 323 (45 MHz) which receives its input from a mixer 324. The front end of the receive section consisting of appropriate band pass filters (BPF) and a low noise amplifier (LNA) feed the mixer 324. A reference oscillator 325 supplies the two mixing frequencies applied to the two mixers 322 and 324 via a synthesizer circuit 326 under control of the microcomputer 307. The input frequency supplied to the second mixer-from the local oscillator is a fixed frequency. In a typical illustrative embodiment this frequency is 45 MHz+/−455 KHz of the second IF frequency.

In the illustrative embodiment, the synthesizer used for generating the transmit carder generates frequencies spaced at 30 KHz intervals for cellular operation and at 10 KHz intervals for local operation. This assures a 30 KHz channel spacing within the 2475 to 2483.5 MHz range in local oscillation as a result of tripling a frequency prior to transmission.

Mixer 324 is connected to a receive a radio signal output of the RF amplifier 331 which in turn receives the RF output of the cellular receiving section 301. Receiving section 301 includes an input BPF filter 333 connected to the common antenna 382. Input filter 333 is tuned to pass the cellular radio frequency band and the appropriate segment in the ISM band of frequencies used for cordless transmissions. The output of filter 333 is applied to a switched ISM band rejection filter 335 which is shunted by the RF switch 336. RF switch 336 is controlled to bypass filter 335 when signals in the cordless frequency band are being received. The RF switch 336 is opened engaging filter 335 in the input RF signal path when signals in the cellular band are being received.

Both cellular and ISM band received RF signals are connected to a linear low-noise amplifier (LNA) 327. The output of the linear amplifier 327 is connected to the combined cellular/ISM BPF 328, which passes either band of frequencies. The output of filter 328 is applied to the RF amplifier 331. Amplifier 331 in turn applies the filtered received signal to the mixer 324, whose relation to the circuitry generating the IF signal is discussed above.

Outgoing communication signals are produced by an internal voltage controlled oscillator VCO of the transmit synthesizer 341 whose frequency is modulated by the audio processor circuit or modem. The operating range of the VCO us reduced by one third when the synthesizer mode is set for ISM transmission to account for frequency tripling in ISM section 303. The baseband information is fed to to a transmitter section 351. The transmitter section 351 is connected to supply outgoing RF signals to an amplifier 353 whose output is in turn connected to a splitter circuit 354 which directs the output signal, in parallel, to the cellular transmit section 302 and the 2.4 GHz transmit section 303. Each section, 302 and 303, is under control of an individual power level control 332 and 333, respectively. The power level controls 332 and 333 determine the operative output power for transmission of radio communication signals. These above synthesizer, transmitter, splitter and power control technologies are well known to those skilled in the art and need not be discussed in detail.

The cellular transmit section 302 includes the RF power amplifiers 355, 356 and 357, connected in cascade, receiving input from the splitter 354. The resultant power level of the amplifiers is controlled by the power control 332. The power level selected is determined by the supervisory sub-system and command signals executed by microcomputer 307 depending on the frequency band selected. If the cellular communication option is chosen the power level is high, while correspondingly the power control 333 lowers the power in the 2.4 GHz transmit section. The resultant output of the series connected amplifiers 355, 356 and 357 is applied to the transmitting cellular transmit BPF 358 whose output is, in turn, connected to the single antenna 382 which, in the illustrative embodiment, has a dimension of a ¼ wavelength at the cellular transmitting frequency.

The signal splitter 354 is also connected to the 2.4 GHz transmit section 303, via a X3 frequency tripler 361, which multiplies the frequency of the output of the transmitter section 351 by a factor of three, placing the signal in the desired ISM 2.4 GHz range of frequencies. The output of the multiplier 361 is applied to a ISM BPF 363 with a pass band frequency range for passing the cordless 2.4 GHz frequencies (range 206 shown in FIG. 2). The power level of this signal is controlled by the amplifier 364 as determined by the power control 333. The amplified signal is applied to an ISM BPF 365 and from thence to a series LC resonant filter 366 tuned to the 2.4 GHz frequency band. The signal is connected to the single antenna 382 which has a dimension of a ¾ wavelength at the transmitted 2.4 GHz frequency.

The control of the mobile radiotelephone handset, in selecting the mode of operation, is determined by a stored program included in the microcomputer 307.

Many of the stored programs therein are standard in existing wireless telephones, well known to those skilled in the art and hence are not discussed herein. The stored programs contributing to the differing operating mode capability are disclosed in the flow diagrams shown in the FIGS. 4 to 9. The various processes detailed include an initialization procedure, an origination procedure, a local-to-cellular handoff procedure, and a cellular-to-local handoff procedure. Variants to this basic procedure may be derived form the following procedures by those skilled in the art to customize overall system functionality for specific intended personal communication applications.

The initialization procedure is invoked as soon as power in the radiotelephone handset is turned on, as indicated by block 401. The flow proceeds to block 403 and the indicators of the radiotelephone handset are turned off. Block 405 reads the features and options that the radiotelephone handset has into a memory contained in the radiotelephone handset. These options and features may be also read from an external memory supplied by a user such as contained within a smart card memory device. A subsequent decision block 407 inquires if the local system (i.e.cordless) option has been enabled by the user. An affirmative decision causes the flow process to proceed to the block 409 which commands the radiotelephone handset radio to tune into the last known local setup channel. Decision block 411 evaluates the system ID, for security purposes, to determine if signals from a valid cordless base station are present. With a valid ID the flow process proceeds to block 413 which causes the local channel number to be stored. A local service indicator is enabled in subsequent block 415 in order to provide a positive indication of local service availability to the user. The next step, as per block 417, is to monitor the local set up control channel. If the local channel set up channel is available, the decision block 419 responds to this by returning the flow process to block 417 which continues to monitor the local set up channel awaiting a request for communication services in the local mode. If a local set up channel is not available the flow process, responding to decision block 419, returns to the block 403.

If decision block 411 determines that the local system ID is not valid the instructions of block 421 tune the radiotelephone handset to the first channel in the local set of channels. A subsequent decision block 423 in the flow process again inquires if the system ID is valid. If it is the flow returns to block 413 and the subsequent flow process is as described above. If the system ID is still determined to be invalid the flow proceeds to the block 425 whose instructions tune the radio of the radiotelephone handset to the next channel in the local set. This successive tuning to new local channels continues until a valid ID is determined or the decision block 427 determines that the local channel set is exhausted. When the local channel set is exhausted the flow proceeds to block 429 which turns the local service indicator off if it was previously on. A subsequent block 431 causes the reading of the options set in memory and then directs the flow process to decision block 433 to determine if the cellular operation option has been enabled by the user.

A no response to the query of decision block 407 causes the flow process to proceed directly to the decision block 433 which determines if cellular service has been enabled. If cellular service has been enabled, the subsequent instruction block 435 performs the conventional cellular setup channel acquisition process. The subsequent decision block 437 determines if a cellular set up channel is available. If no cellular set up channel is available the flow process returns to the block 403. If such a setup channel is available, however, a subsequent decision block 439 determines if the system ID is valid in concert with the cellular network. With an invalid ID the flow again returns to the block 403. With a valid ID the flow proceeds to block 441 which turns on the cellular service indicator and which indicates if the radiotelephone handset is in a home or roam mode. Block 443 sets a timer and within the time set the block 445 through its instructions monitors the cellular set up channel. Pending expiration of the time interval the decision block returns the flow to the decision block 437, Upon expiration of the timer interval the flow returns to the input to block 405. This action causes periodic testing of the availability of both local cordless and cellular operating environments and alerts the status to the user via indicators on the handset device.

Figure 5:
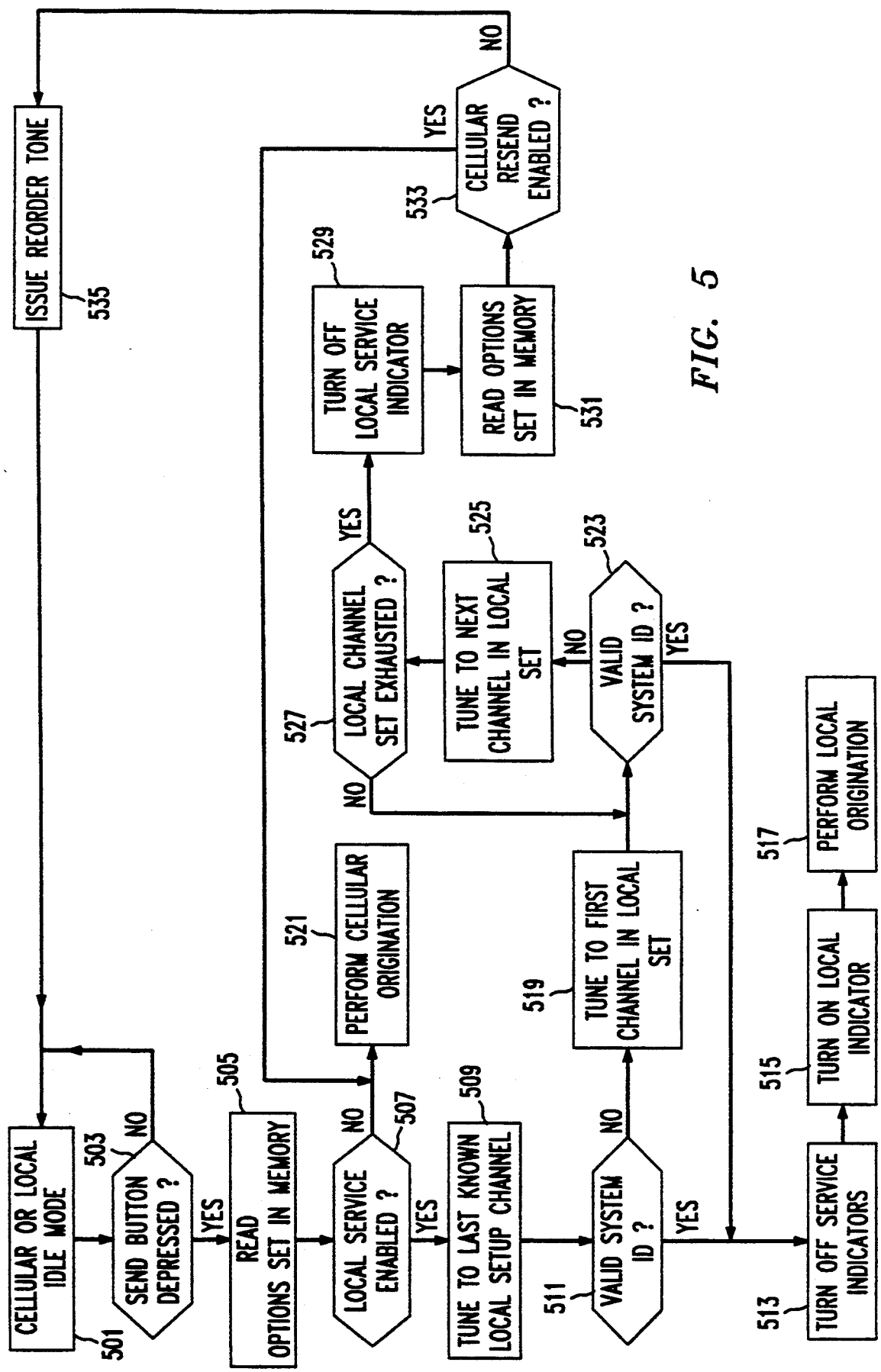
Figure 7:
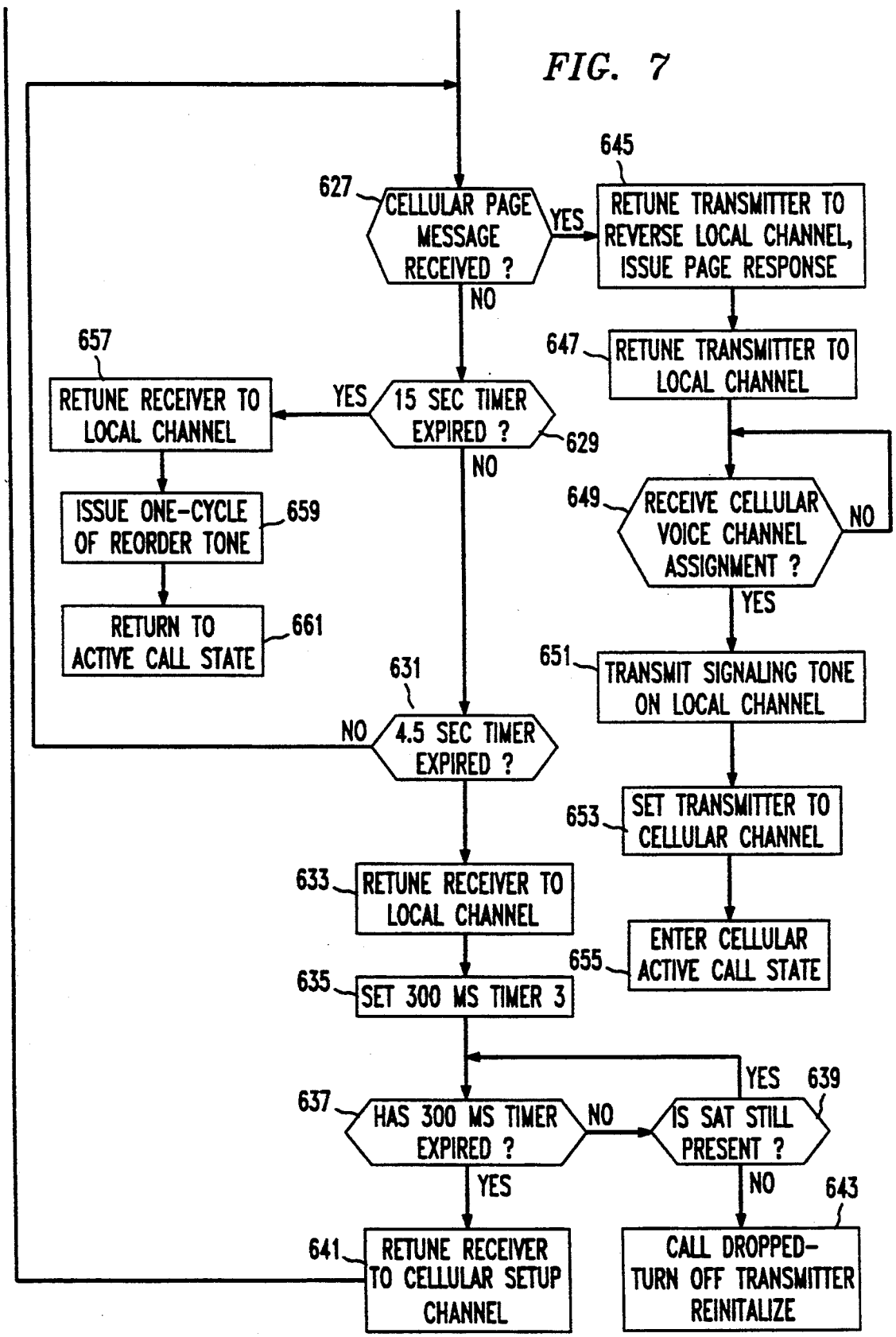

An origination procedure for allowing call placement from the radiotelephone handset is shown in the flow chart in FIG. 5. The process is initiated in block 501 which indicates the operative mode as either a cellular or local idle mode. The subsequent decision block 503 responds to the activating of a send or transmit button and invokes the instruction block 505, in response to activating to read out the radiotelephone handset's options out of its memory, such as a local dial tone option, or from an external memory such as a smart card. The subsequent decision block 507 determines if local service has been enabled. If the result is no, the flow process continues to block 521 whose instructions cause cellular origination to occur. If decision block 507 determines that local service has been enabled, the subsequent instruction block 509 tunes the radiotelephone handset to the last known local setup channel for service in the cordless mode.

Decision block 511 queries if the system ID is valid. If it is, the cellular service indicators are turned off by the instructions of block 513 and the local service indicator is turned on by the instructions of the subsequent block 515. Subsequent block 517 include instructions to perform a local origination which follows a cellular format.

If decision block 511 determines that the system ID is invalid the flow proceeds to block 519 whose instructions tune the radiotelephone handset to the channel contained in the local channel set. Decision block 523 again determines if the system ID is valid. With a valid ID the flow returns to block 513. If the system ID is still invalid the block 525 instructs the radio to tune to the next channel in the local channel set. As long as additional local channels are available new channels are tuned. When the local channel set is exhausted decision block 527 directs the flow to the block 529 which turns off the local service indicator. The subsequent block 531 reads the options set in memory. The subsequent decision block 533 determines if cellular resend has been enabled. If it is the flow proceeds to the block 521 a cellular origination if performed. If it is not, the flow proceeds to block 535 which issues a reorder tone and returns the flow to the initial block 501.

The control functions embodied within this universal system are intended to provide handoffs between the local system (i.e.cordless) and the cellular system while the radiotelephone handset is in use provided that appropriate coverage is available. The handoff procedures are described by the flow charts shown in FIGS. 6–9. In the handoff process of FIG. 5, the handset is assumed to be in an actual call and on a voice channel. The following handoff, for illustrative purposes, is assumed to be a "soft" handoff in which the handset maintains actual communication connections with both the local and cellular system. The process initiates a flash signal at the handset in response to activating a button for call trunks. A local-to-cellular handoff begins during an active local call state as shown in the block 601, if the signal strength becomes impaired. The instructions of block 603 read the handoff received signal strength threshold (RSSI) from memory. Decision block 605 determines if the received signal strength is above the acceptable signal strength threshold (i.e. the radiotelephone handset is within the local range). If it is, the flow returns to the block 601 with the radiotelephone handset remaining in an active local call state. If the average RSSI is below the threshold, the instructions of block 607 issues an "exiting usable range" warning tone to the handset user indicating that if he/she moves further away from the local base station a handoff must be executed or the call may be lost (i.e. disconnected). The options set in either internal memory or in an external memory such as a smart card are read in response to the instructions of block 609, and a subsequent decision block 611 determines if a handoff to cellular is enabled. Subsequent instruction block 613 causes a flash signal to be transmitted to the local base station to signal a request for a cellular handoff. Decision block 615 determines if the send dialed digits order has been received. This evaluation is recycled until the send dialed digits order is received. The instructions of block 617 then send the handset cellular number to the local base station and the instructions of block 619 introduce a short delay to accommodate call processing in transferring from a local system to the cellular system.

The instructions of block 621 retune the radiotelephone handset receiver to acquire a cellular setup channel while still continuing to transmit on the channel communicating with the local area base station. Subsequent block 623 sets a 15 second timer. An interval of, for example, 15 seconds is set to establish a window within which a successful handoff from the local base station to a cellular base station is to be completed. The next block 625 sets, for example, a 4.5 second timer. The setting of this time interval ensures that radiotelephone handset will transmit for longer than 4.5 seconds without inspecting the local receive channel and determining that SAT is still present. The presence of a radio SAT supervisory audio tone signal is analogous to sensing loop current in a land line phone and which if lost for more than 5 seconds dictates that the call must be terminated.

Decision block 627 (proceed to FIG. 7) determines if a cellular page message has been received by the radiotelephone handset. If a forward page message has been received than the instructions of block 645 retune the cellular transmitter of the radiotelephone handset to the cellular reverse setup channel and cause a page response to be issued answering the page message received from the cellular base station in accord with conventional cellular standards. Instructions of block 647 now retune the transmitter to the local area channel to maintain call continuity. Decision block 649 determines if a cellular voice channel has been assigned and upon such assignment transmits a signaling tone on the local channel, as per the instructions of block 651 to indicate that the cellular voice channel assignment is complete, and that the local radio link may be disconnected. The instructions of subsequent block 653 set the transmitter to the designated cellular voice channel and as per instructions of block 655 the radiotelephone handset is thus enabled operative in the cellular system.

If decision block 627 responds negatively, the flow proceeds to decision block 629 to determine if the 15 second timer has expired. If the 15 second time interval has expired the flow proceeds to the block 657 which retunes the radiotelephone handset receiver to the local channel. Block 659 subsequently issues one cycle of a reorder tone, indicating an unsuccessful handoff attempt to the cellular system, and the block 661 returns the local call to an active call state.

If the 15 second time interval has not expired the flow proceeds to decision block 631 to determine if the 4.5 second time interval has expired. If it has not expired, the flow returns to the input of decision block 627. If the 4.5 second time interval has expired, the instructions of the subsequent block 633 retune the receiver to the local channel. A 300 millisecond timer is set in the subsequent block 635. The 300 millisecond time interval is a window within which a SAT tone must be detected by the local base station in order to maintain the call. The decision block 637 determines if the 300 millisecond interval has expired. If it has not, the decision block 639 determines if the SAT tone is present. If the SAT tone is present, the flow recycles through decision block 637. If the SAT tone is not present, the local call is dropped, as per the instructions of block 643 and the process is terminated. If the timer has expired the flow proceeds from the decision block 637 to the block 641 which retunes the receiver to a cellular set up channel and continues the flow to the input of block 625 (see FIG. 6).

Figure 8:
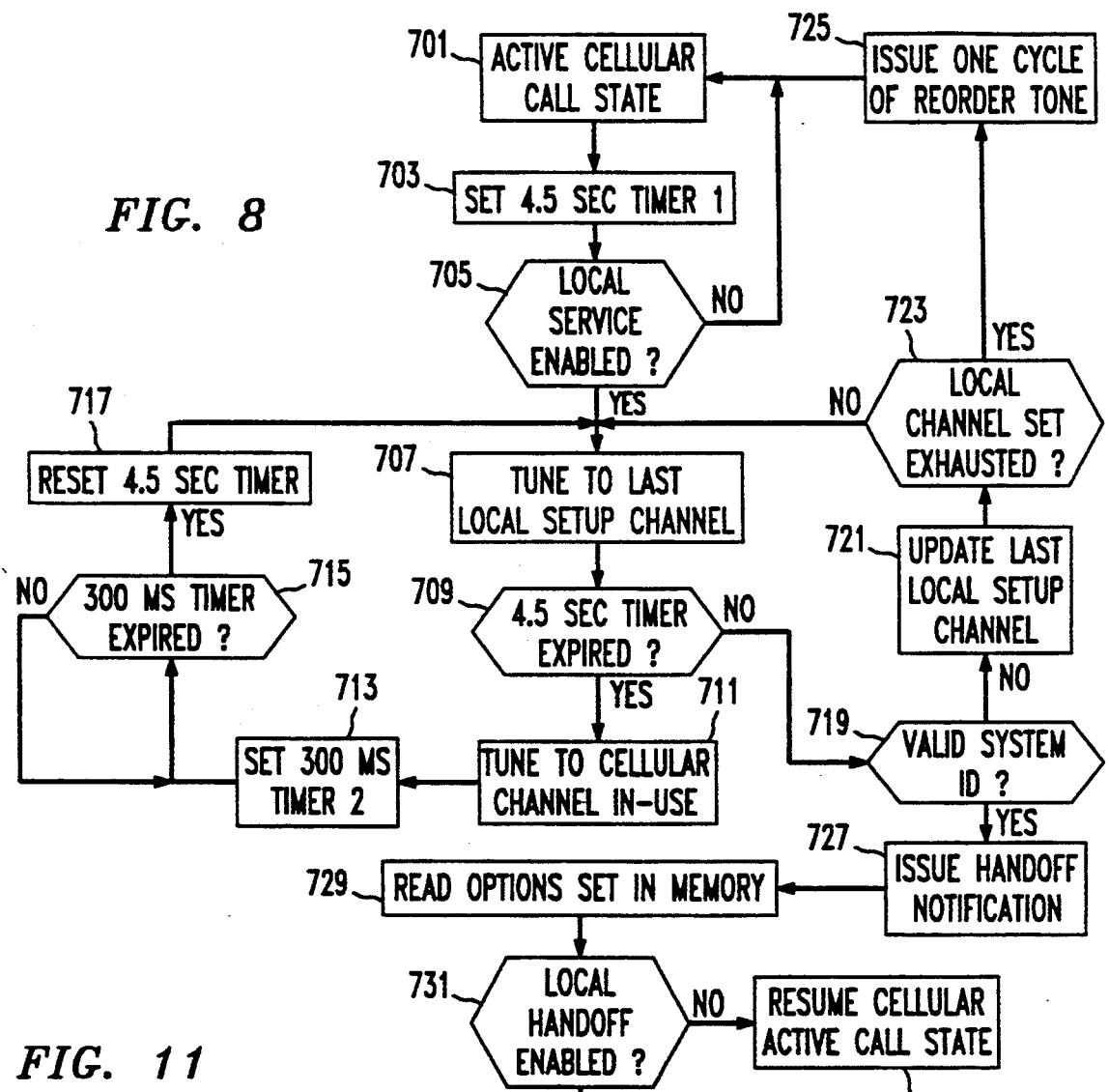
Figure 11:
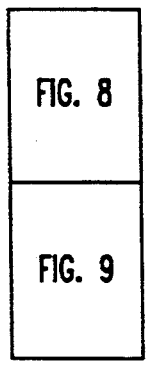
Figure 9:
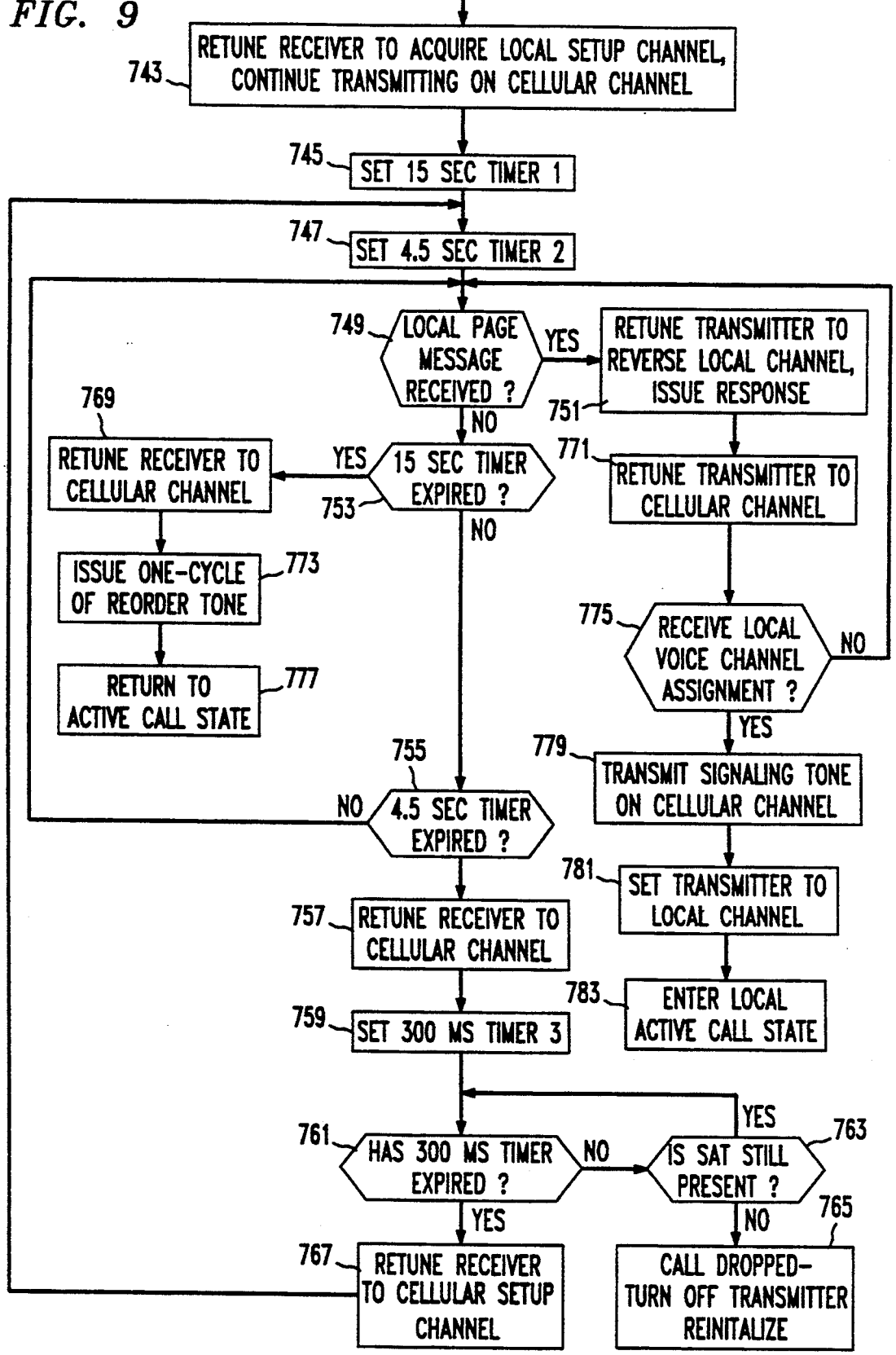

Handoff from a cellular to a local system is controlled according to the flow process shown in the FIGS. 8–9 which is similar in overall operation but not identical to the above described handoff operation. At the beginning of the process block 701 the radiotelephone handset is in an active cellular call state. The next block 703 sets a timer to a 4.5 second interval, and subsequent decision block 705 determines if local service is presently enabled. If it is not so enabled, the flow returns to the block 701 representing the active cellular call state. If local service is enabled the flow proceeds to block 707 whose instructions tune the radiotelephone handset to the last known local setup channel. The subsequent decision block 709 determines if the 4.5 second timer has expired. If it has not expired, the flow proceeds to the decision block 719 which determines if a valid system ID is present. If no valid system ID is present the flow continues to block 721 whose instructions update the last local setup channel. Subsequent decision block 723 determines if the local channel set has been exhausted. If it is, the flow progresses to block 725 which issues one cycle of a reorder tone indicating that handoff to the local system cannot be accomplished (i.e the local base station is out of range). If the channel set is not exhausted the flow proceeds to block 707 whose instructions tune the radiotelephone handset to the last local setup channel. The flow continues to the decision block 709 as described above.

If decision block 709 determines that the 4.5 second timer has expired the flow proceeds to block 711 whose instructions tune the radiotelephone handset to a cellular channel. The subsequent block sets a 300 millisecond timer for ensuring that SAT remains present. As soon as the 300 millisecond interval expires, as determined by decision block 715, the instructions of block 717 reset the 4.5 second timer and the flow proceeds to the input of the block 707.

If the decision block 719 determines that the system ID is valid, the flow process proceeds to the block 727 whose instructions cause a handoff notification to be issued. The instructions of the subsequent block 729 cause the radiotelephone handset to read the options contained in memory or in a smart card. Decision block 731 determines if the local handoff has been enabled. If it has not then the instructions of block 733 resume the active cellular call state. If the local handoff has been enabled, a flash signal is transmitted to the cellular base station as per the instructions of block 735. A subsequent decision block 737 inquires if the send dialed digits order has been received, and allows the call transfer to occur when this process is completed. The instructions of the block 739 then send the local number to the cellular base station. Block 741 inserts a delay in the process to accommodate the call processing.

The instructions of block 743 (see FIG. 9) retune the handset receiver to acquire the local setup channel and to continue transmitting on the cellular voice channel. The 15 second timer is set in block 745 and the 4.5 second timer is set in block 747. The decision block 749 determines if the local page message has been received. If the local page message has been received the transmitter of the radiotelephone handset is retuned to the reverse local channel and a page response is issued. The instructions of the block 771 now retune the transmitter to the cellular channel. Decision block 775 determines if the local voice channel assignment has been received. If it has not then the flow returns to the decision block 749. If the local voice channel has been received, the instructions of the subsequent block 779 transmit a signaling tone on the cellular channel to indicate that the cellular call is to be terminated and the instructions of subsequent block 781 set the transmitter of the radiotelephone handset to the local channel. The radiotelephone handset now enters a local active call state as indicated by block 783.

If decision block 749 determines that a local page message has not been received, the decision block 753 determines if the 15 second time interval has expired. If it has, the instructions of block 769 retune the radiotelephone handset receiver to a cellular channel. The instructions of subsequent block 773 issue one cycle of a reorder tone indicating that a handoff could not be completed and the radiotelephone handset returns to a cellular active call state as indicated in block 777.

If decision block 753 determines that the 15 second timer has not expired, the subsequent block 755 queries if the 4.5 second timer has expired. If this timer has not expired the flow returns to the input to decision block 749. If it has expired the flow proceeds to block 757 whose instructions retune the receiver to a cellular channel. Subsequent block 759 sets a 300 millisecond timer and the flow proceeds to decision block 761 which evaluates if the 300 millisecond time interval has expired. If this 300 millisecond interval has not expired the flow proceeds to block decision block 763 which causes the process flow to recycle through decision block 761 as long as SAT is present. If the 300 millisecond interval has expired the instruction or block 767 retune the receiver to the cellular setup channel and the flow returns to block 747. If the 300 millisecond timer has not expired the decision block determines if the SAT tone is still present and if it is then the flow returns to decision block 761. If it is not present the call is dropped and the transmitter is turned off and is reinitialized as shown in the block 765.

Base stations suitable for application to the dual wireless system are designed to begin operation in a learn mode of operation which is a part of instruction as discussed above in a learn mode of operation. During the learn mode interval the base station transmits a forward control message, which may be received by a handset to be used in conjunction with that base station. In the illustrative example, an AMPS signaling process is used. Certain numeric fields of the transmitted forward control message instruct the handsets to transmit both their full telephone number and their ESN (i.e. Electronic Serial Number) when originating or responding to pages. An LSI (Local Signal Indicator) is included with the handset to indicate receipt of this message. The user causes the handset to originate a call by pressing the "send" button. The telephone number and ESN are stored in the memory of the microcomputer which supervises the base units operation and the base station causes the handset to be returned to its idle state. Activation of a provided button at the base station causes the learn mode to be terminated and the base unit now accepts radio system originations and page responses only from the "registered" handsets. As handsets are added to the list or removed from the list the learn mode is accordingly reactivated. With completion of the learn mode the base unit is available for service. The base station now transmits overhead messages which are monitored by the handsets. If the transmitted ID matches a serving system ID stored in the number assignment module (NAM) of the handset the handset is locked to the forward channel and displays a local service indication. Thus a single local base can be set up to handle multiple handsets which is not presently allowed with the conventional cordless units.

This learning mode of operation is to assure that call connections are made only with qualified handsets. This allows the implementation of fraud protection through security measures as presently used in conventional cellular systems. The handset user originates a call by dialing a number and presing the "send" button. The base station reads the handset's telephone number and the ESN. If it is listed the base station assign the handset a voice channel.

Calls addressed to the handset from the public telephone network via landlines are handled similarly. Handsets in the local area are assumed to be monitoring the forward setup channel. The base station answers the call and sends a page message for those telephones whose identity was stored during the learning interval. All handsets are sequentially paged, and in the absence of a response the base station responds to the wireline caller with a stored voice message that the handset user is not available. The operational functions in paging, call origination and handoffs are discussed in detail herein below in describing the operation of the subscriber cordless base unit disclosed in the FIG. 12.

Figure 12:
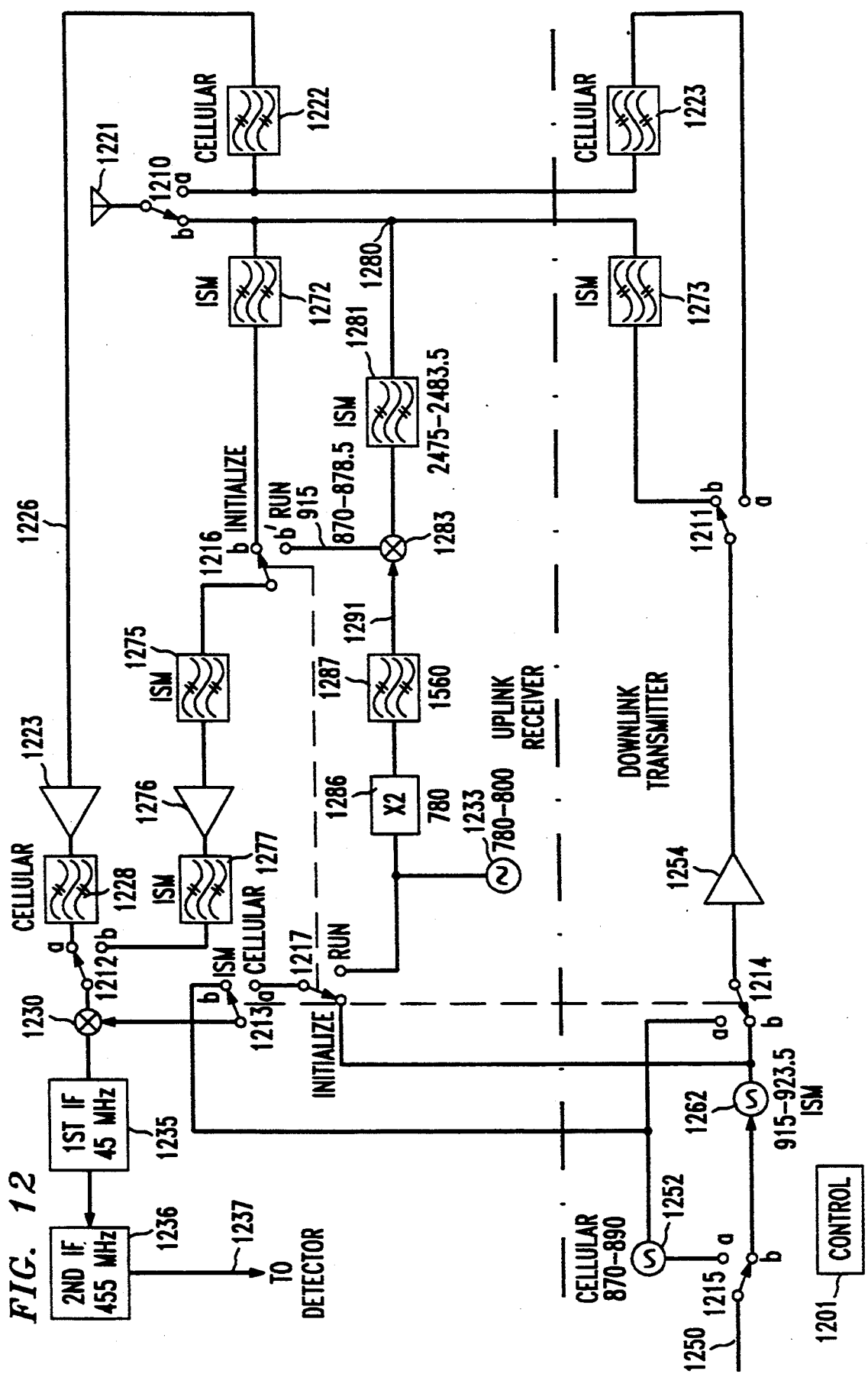
FIG. 12 is a schematic of a transceiver included in a cellular or cordless base station operative to communicate with the handset of FIG. 3.

A suitable radio transceiver arrangement for a base station is shown in the FIG. 12 and includes a plurality of frequency conversion and filtering circuits for communicating over the various contemplated cellular and cordless radiotelephone voice and data transmission frequencies. As shown the transceiver is shown possessing a plurality of switches 1210, 1211, 1212, 1213, 1214,

1215, 1216 and 1217 which are all illustratively shown as two pole mechanical switches. Switches 1210 to 1215 allow the transceiver to process ISM or cellular frequency and are joined together to switch in unison. Switches 1216 and 1217 are joined together to change between run and initialization modes. Each switch has an "a" and "b" position with the exception of switches 1216 and 1217 which have an initialize and run position. When a switch is connected in the "a" position the transceiver is operative to process signals in the cellular wireless frequency ranges. The run switch position of the switches 1216 and 1217 allows the base station receiver to tune to either 2475–2483.5 GHz when operating in the ISM (local) mode or 825 to 845 MHz when operating in the cellular mode. In the initialize mode it receives 915 to 923.5 MHz in the ISM mode and 870 to 890 MHz in their cellular mode. The initialize mode is used to allow the base station to choose a clear (i.e. unused) cell frequency for operation during initialization in either the ISM or cellular bands. This enables the cordless base transceiver to process signals in the above defined cordless or ISM frequency ranges. These switches are typically embodied as semiconductor switches under direction of controller 1201 which may comprise a microprocessor control or a part of the overall microprocessor controller of the base station that operates in a similar fashion to the companion controlled contained in the handset.

The operation of the base transceiver may be explained by describing its functions in handling the voice and data signals in the various frequency ranges and modes of either cellular or cordless operation. When the transceiver is connected to process cellular frequency voice and data signals the switchs 1210 through 1215 are all connected to terminal "a". The antenna 1221 is then connected to the cellular filters 1222 and 1223 which are connected to provide traditional duplex filtering and separation of RF signals intended for full duplex transmission from the received signals. In the instance of a received cellular telephone signal, the signal is transmitted via the filter 1222 and lead 1226 to the amplifier 1223 and the filter 1228. The output of the cellular filter 1228 is applied, via the switch 1212, connected to the "a" terminal, to the mixer circuit 1230. Mixer 1230 is activated by a cellular mixing frequency of 780 to 800 MHz supplied by the local oscillator 1233. The output of the mixer 1230 is applied to first and second IF circuits 1235 and 1236 which operate in the 45 MHz and 455 KHz frequency ranges respectively and supply baseband signal output, via lead 1237, connected to detector circuitry.

The transmission of outgoing radiotelephone signals begins with the broadband signal applied to the lead input 1250. Signals to be transmitted at cellular frequencies are applied, via. switch 1215 connected to terminal "a", to the carrier oscillator 1252. The modulated carrier signal output of oscillator 1252 is transmitted, via switch 1214, connected to terminal "a" and amplifier 1254 and, via switch 1211 connected to terminal "a", to the output filter 1223 of the duplex arrangement. The output of the filter 1223 is coupled, via the switch 1210 connected to the "a" terminal, to the antenna 1221.

Outgoing radiotelephone signals in the ISM band of frequencies are coupled from lead 1250, via the switch 1215 connected to the "b" terminal, to the oscillator 1262 which supplies the carder signal for the ISM band. The modulated signal output of the oscillator 1262 is applied, via the switch 1214 connected to the "b" terminal, to the amplifier 1254. The amplifier output is coupled to the ISM output filter 1273 and the switch 1210 connected to the "b" terminal and from that terminal to the antenna 1221.

Incoming ISM frequency signals in the 2475 MHz band, in the run mode, are directly connected, via node 1280 to the ISM filter 1281. The output of the filter is applied to the mixer 1283. The oscillator 1233 supplies the mixing frequency for mixer 1283. The output of oscillator 1233 is also applied to a X2 frequency multiplier 1286 which doubles the signal frequency and applies it to the filter 1287. The filter output signal is at a frequency of 1560 MHz and this signal is applied, via lead 1291, as the local oscillator signal to the mixer 1283. The mixed signal is coupled, via ISM filter 1275, amplifier 1276 and filter 1277 to mixer 1230 and processed as described above.

Incoming signals on the ISM bands at the 915 MHz band, in the initialize mode, are muted from the antenna 1221, via the switch 1210 connected to the initialize terminal and the ISM filter 1272 to the switch 1216. For this frequency band the switch is connected to the "?a" terminal. The ISM signal is applied to the ISM filter 1275 and from that filter to the amplifier 1276. A subsequent ISM filter 1277 couples this signal via the switch 1212, connected to the initialize terminal and to the mixer 1230. The signal frequency of the oscillator 1252 is applied as the local oscillator frequency to the mixer, via the switch 1213, connected to the terminal "b". This frequency reduces the voice and data signal to a 45 MHz range and applies it to the IF circuit 1235.

Switches 1216 and 1217 when connected to the initialize terminal are set to allow an initialization of the base station transceiver. This connection allows the transceiver to adjust to operate at a different frequency range to allow control unit 1201 to survey the RF channels used by nearby base stations and hence select the clearest channel for use.

As is readily apparent to those skilled in the art the oscillator 1252 is operative as both a a carrier signal generator as well as a mixing frequency source. This arrangement advantageously limits the component count and enhances the economy of the transceiver.

The cordless base stations are designed to operate at RF frequency bands covering the cellular telephone frequency band,(825 to 890 MHz or 900 MHZ band) and in the ISM bands (2400 MHZ band). Selection of an immediate operating frequency band is under the command of a stored program that is driven by the extant operating parameters including handset modes received supervisory commands from the handset if active. In the receiver section a common IF frequency (45 MHZ) is selected to handle all the bands. In order to provide automatic assignment of cordless base station frequencies (control channel and voice channel) the base station is tuned to the cellular and ISM uplink frequencies (handheld transmit frequencies) as well as respective downlink channels.

In order to select the appropriate operating frequency the cordless base station surveys all channels available for indication of possibly interfering channels. When idle the signal strength of available channels is measured and the lowest signal strength or interference level identifies the best channel for future use.

With completion of selection of the channel, the cordless base station begins to transmit downlink control channel messages to notify operating and valid ID confirmed handsets that service is available. The handsets acknowledge this signal and may activate a visible local service indicator for the subscriber.

Figure 13:
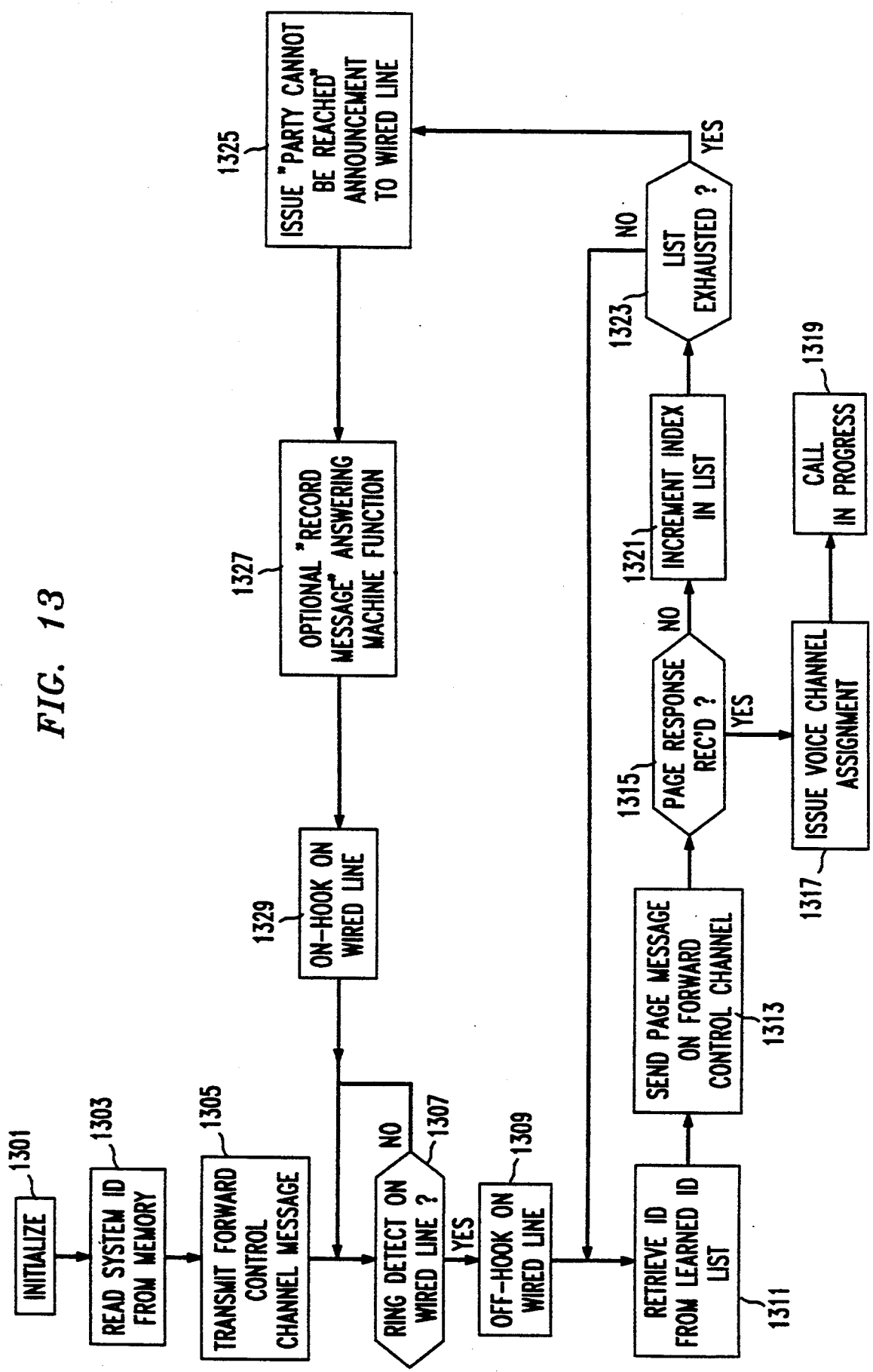

The cordless base station sends paging messages to determine the existence of handsets within its service area. This activity is shown in the flow chart of FIG. 13. The flow process begins at the initialization block 1301 and the instructions of the subsequent block 1303 read the system ID from its memory. In the block 1305 the instructions command a forward transmission of a control channel message. The subsequent instructions of decision block 1307 inquire if a ring is detected on a wired line to the base station. This instruction is recycled until the ring is detected. When the ring is detected the instructions of the subsequent block 1309 declare an off hook condition on the wired line. The ID of the intended recipient is retrieved from the learned ID list, as per the instructions of block 1311, and a page message is sent on a forward control channel as per the instructions of block 1313.

The reception of a page response from the handset is determined by the instructions of decision block 1315. If a page response is received the flow proceeds to block 1317 whose instructions cause a voice channel assignment to be issued. With this response the call is now in progress as indicated by block 1319.

If there is no response to the page request the instructions of block 1321 increment the index to select the next ID in the list and by the instructions of decision block 1323 determine if the list is exhausted. If not the next ID on the list is retrieved and the flow proceeds to the input of block 1311. If the list is exhausted, the flow proceeds to block 1325 whose instructions cause a "party cannot be reached" announcement to the wired line or in the subsequent instruction of block 1327 to provide message recording. The instructions of block 1329 cause the wired line to go on hook and the flow returns to the input of decision block 1307 to await another incoming call from the public telephone network.

Figure 14:
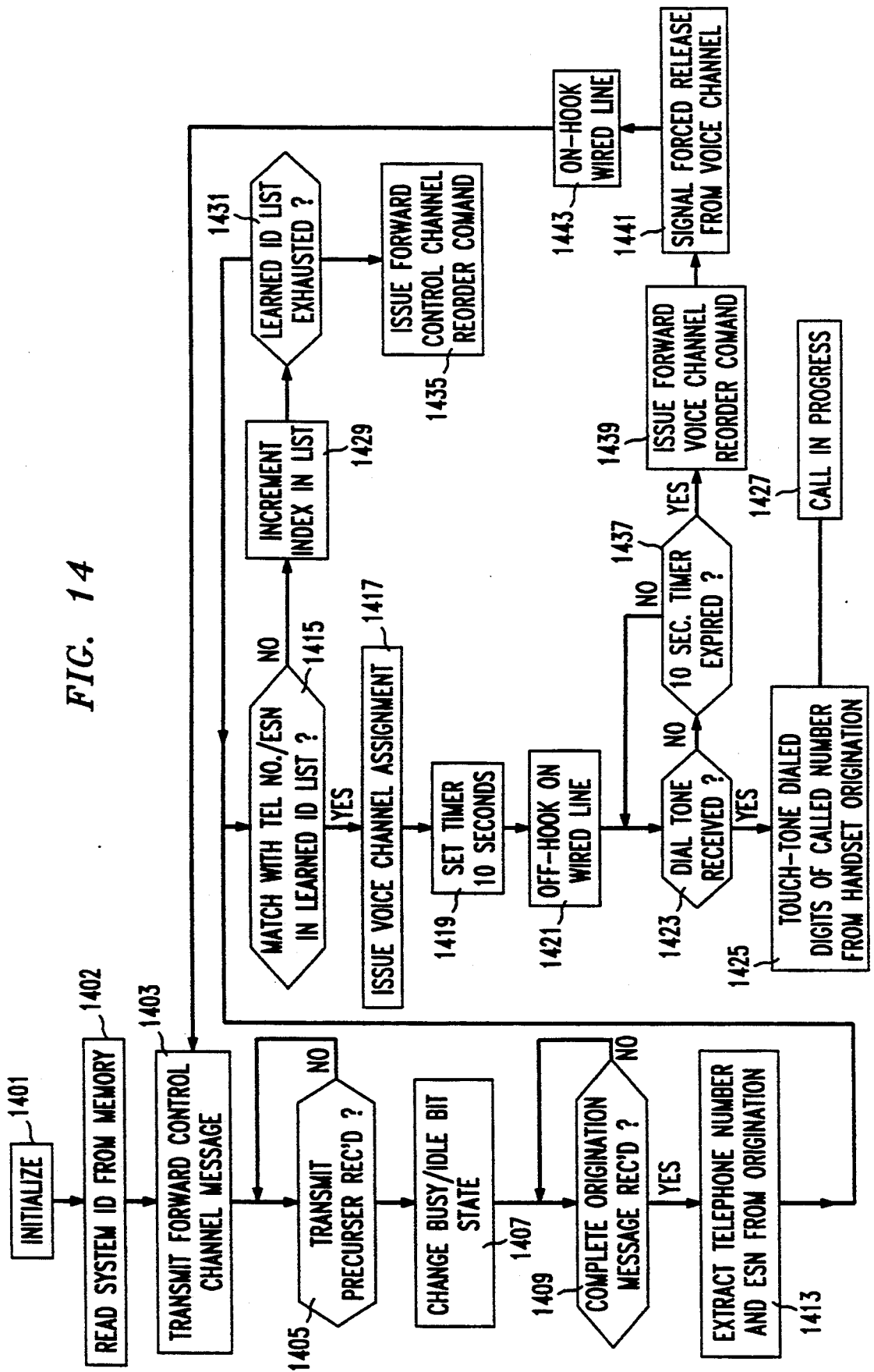

The handsets may also make call originations to the telephone network, via the base unit, using the flow process for this activity is shown in the flow chart of FIG. 14.

Beginning at the initialization block 1401 the flow proceeds to read the system ID from memory as per the instructions of block 1402. A forward or downlink control message is broadcast or transmitted as directed by the instructions of block 1403. This message is monitored by all the handsets in the service area. A continuing decision of whether a transmit precursor has been received is determined by the instructions of block 1405. When the inquiry is answered affirmatively the busy idle bit state contained within the memory is changed, as per the instructions of block 1407. A subsequent decision in accord with decision block 1409 determines if the complete origination has been received. When the decision is affirmative the flow proceeds to block 1413 whose instructions extract the telephone number and ESN from the originating handset. These items are compared with a previously learned valid list contained in the memory of the base station. A decision, as per block 1415, that these valid and authenticated causes the base station to issue a voice channel assignment as per the instructions of block 1417.

A timer is set, as per the instructions of block 1419, to 10 seconds to allow for any handoff interval to succeed. This time is selected to be shorter than the 15 seconds programmed in the handset as described above. The instructions of block 1421 cause the wired line to go off hook and the subsequent decision block 1423 has instructions to inquire if dial tone has been received. If the dial tone has been received the instructions of block 1425 cause the touch tone dial tones to be issued and the subsequent block 1427 indicates that a call is in progress.

If the dial tone is not received the instructions of decision block 1437 determine if the 10 second timer has expired. If it has not, than the flow returns to the input of decision block 1423. If it has, than the flow proceeds to the block 1439 whose instructions issue a forward voice channel reorder command. The instructions of the subsequent block 1441 signal a forced release from the voice channel and the wired line is placed on hook as per block 1443. The flow then returns to the block 1403 to await another call origination from the handset.

Returning to the decision block 1415 a negative response to the decision block 1415 causes the flow proceed to the block 1429 whose instructions increment the index in the list and in decision block 1431 the inquiry is made as to whether the learned ID list is exhausted. If it is not, than the flow returns to the input of decision block 1415. If the list is exhausted the flow proceeds to the block 1435 whose instructions cause a forward control channel reorder command to be reissued. The flow then proceeds to the block 1403 to await another call origination from the handset.

The local to cellular handoff procedure of the cordless base station is shown in the flow chart of the FIG. 15. As block 1501 indicates, a call is in progress and a handoff may be advisable. The instructions of decision block 1503 inquire if a flash request has been received from the handset. If no flash request has been received the flow continuously recycles around the block 1503. If a flash request has been received the instructions of subsequent decision block 1505 inquires if the handoff request code has been received. If no handoff request code is received, the flow proceeds to the block 1507 whose instructions cause a reorder tone to be issued and the flow returns to block 1501. If a handoff request code has been received the flow proceeds to the block 1509 whose instructions set a timer for 30 seconds. This defines a time interval window within which a handoff is to be completed.

The instructions of the subsequent block 1511 issue a flash to the wired line. Subsequent decision block 1513 determines if a dial tone has been received. It continues to recycle until a dial tone is received and in the subsequent block 1515 instructions cause the handset cellular number to retrieved from memory. The call is transferred to the handset cellular number, via the wired line, as per the instructions of the subsequent block 1517.

A subsequent decision block 1521 instructs the process to inquire if a signaling tone has been received from the handset. If it has not the instructions of subsequent decision block 1519 inquires if the 30 second time interval has expired. If it has not, the flow returns to the input to the decision block 1521. If it has, the flow proceeds to the decision block 1525 discussed below.

If the SAT is not being received from the handset, the flow proceeds to block 1523 whose instructions cause transmission on the voice channel to terminate. The instructions of the subsequent block 1527 cause an on-hook condition to occur on the wireline. The subsequent block 1529 indicates an initialization state.

If the 30 second time interval has expired the flow proceeds from the decision block 1519 to the decision block 1525. The instructions of this block inquire if the SAT is still active. If it is not the flow proceeds to the block 1523 and the process proceeds as described above.

If the SAT is still active the flow proceeds to the block 1531 whose instruction place the wired line on hook. The flow proceeds to the block 1501 indicating a call in progress.

While the air interface at the above described system is illustratively arranged it is to be understood that the principle of the invention may be applied to digital air interface, such as TDMA systems and variations thereof. Including other variants including PBX, key systems and other telecommunication interfaces that ultimately connect to the public telephone network will be readily apparent.

We claim:

1. A universal wireless radiotelephone communication apparatus operative in a first radiotelephone communication including a first base station having a wide area of coverage, transmitting radiotelephone signals at first band of frequencies and in a second radiotelephone communication system including a second base station having a localized area of coverage, transmitting radiotelephone signals at a second band of frequencies higher than said first band of frequencies with an offset of less than twice a frequency contained within said first band, the wireless radiotelephone communication apparatus comprising:

radio signal reception means for receiving radio signals of two frequencies and including a minimized RF circuit having a single front end circuitry including a filter for rejecting one of the two frequencies and a RF switch connected to bypass the filter and couple radiotelephone signals to the minimized RF circuit;

baseband circuitry connected to the radio signal reception means for processing received radiotelephone signals of both the first and second band of frequencies;

radio signal transmission means connected to receive signals from the baseband circuitry and including a first radio transmission path and including a frequency multiplier interconnecting the baseband circuitry to a second radio transmission path; and an antenna whose electrical length is a quarter wavelength of a frequency within the first band of frequencies and a three quarter wavelength of a frequency within the third band of frequencies.

2. A universal wireless radiotelephone communication apparatus as claimed in claim 1; comprising:
stored data processing control included in the wireless radiotelephone communication apparatus; including:
means for enabling a handoff from the first base station to the second base station, and
means for enabling a handoff from the second base station to the first base station.

3. A universal wireless radiotelephone communication apparatus as claimed in claim 2; comprising:
means for initializing the wireless radiotelephone communication apparatus for operation with one of the first base station and the second base station.

4. A universal wireless radiotelephone communication apparatus as claimed in claim 2; comprising:
means for originating calls to one of the first and second base stations.

5. A universal wireless radiotelephone communication system; comprising:

a first plurality of wide area coverage base stations, including a radio transceiver apparatus and a radiant and receiving antenna, and operative in a first band of frequencies;

a second plurality of local area coverage base stations including a radio transceiver apparatus and a radiant and receiving antenna, operative in a second and third band of frequencies with the second band higher in frequency than the first band of frequencies and the third band of frequencies higher in frequency than the second band of frequency;

the first plurality of wide area coverage base stations and the second plurality of local area coverage base stations all connected to a common land telephone network;

a personal radiotelephone handset for communicating with the first plurality of wide area coverage base stations and the second plurality of local area coverage base stations; including:

a baseband circuit for processing IF signals for all three bands of RF frequencies;

first minimized RF circuit means connected to the baseband circuit for generating signals for transmission within the first band of frequencies for transmission to the first plurality of wide area coverage base stations;

second minimized RF circuit means connected to the baseband circuit through a frequency tripler for generating signals for transmission within the third band of frequencies for transmission to the second plurality of local area base stations; and the first and second minimized RF circuit means circuit sharing radio mixers and IF processors in common;

an antenna whose electrical length is a wavelength of a subharmonic frequency within the first band of frequencies and an integer multiple wavelength of a subharmonic frequency within the third band of frequencies;

filter circuitry interconnecting the antenna to the first and second RF circuit means; and including a reject filter to reject the third band frequencies and a RF switch connected to bypass the reject filter.

6. A universal wireless radiotelephone communication system as claimed in claim 5; comprising:
stored data processing control included in the wireless radiotelephone communication apparatus; including:
means for enabling a handoff from the first base station to the second base station, and
means for enabling a handoff from the second base station to the first base station.

7. A universal wireless radiotelephone communication system as claimed in claim 5; comprising:
means for initializing the wireless radiotelephone communication apparatus for operation with one of the first base station and the second base station.

8. A universal wireless radiotelephone communication system as claimed in claim 5; comprising:
means for originating calls to one of the first and second base stations.

9. A universal wireless radiotelephone communication system as claimed in claim 5; comprising:
wherein the antenna has an electrical length of a quarter of a wavelength of a frequency within the first band of frequencies and an integer multiple of a quarter wavelength of a frequency within the third band of frequencies.

10. A universal wireless radiotelephone communication apparatus operative in a first radio telephone communication system including a first base station having a wide area of coverage, transmitting radio signals at a first band of frequencies and in a second radiotelephone communication system including a second base station having a localized area of coverage, transmitting radiotelephone signals at a second band of frequencies higher than said first band of frequencies with an offset of less than twice a frequency contained within said first band;
the wireless radiotelephone communication apparatus comprising:
baseband circuitry for processing received radiotelephone signals and signals generated by a user of the radiotelephone communication apparatus;
a first minimized RF circuit means for generating signals for transmission within the first band of frequencies for transmission to the first base station;
a second minimized RF circuit means of transmission within a third band of frequencies having a frequency three times a frequency within the first band of frequencies for transmission to the second base station; and
the first and second RF circuit means being connected to the baseband circuitry and each sharing in common radio mixers and IF processors for processing radio signals at the first and third band of frequencies;
an antenna whose electrical length is a wavelength of a subharmonic frequency within the first band of frequencies and an integral multiple wavelength of the subharmonic frequency within the third band of frequencies;
filter circuitry interconnecting the antenna to the first and second RF circuit means and including a reject filter to reject the third band of frequencies and a RF switch connected to bypass the reject filter.

11. A universal wireless radiotelephone communication apparatus as claimed in claim 10; comprising:
stored data processing control included in the wireless radiotelephone communication apparatus; including:
means for enabling a handoff from the first base station to the second base station, and
means for enabling a handoff from the second base station to the first base station.

12. A universal wireless radiotelephone communication apparatus as claimed in claim 11; comprising:
means for initializing the wireless radiotelephone communication apparatus for operation with one of the first base station and the second base station.

13. A universal wireless radiotelephone communication apparatus as claimed in claim 11; comprising:
means for originating calls to one of the first and second base stations.

14. A wireless radiotelephone mobile communications apparatus that operates in a first and second wireless air interface,
the first air interface operating within a first range of frequencies including uplink and downlink frequency bands;
the second air interface operating within at least a second range of frequencies including uplink and downlink frequency bands, one band being greater than a frequency within the first range of frequencies by an integer multiple;
comprising:
radio frequency processing circuitry including
an antenna having a wavelength defined length to operate within both ranges of frequencies;
RF/IF conversion circuitry;
a receive section interconnecting the antenna to the RF/IF conversion circuitry and including a first filtered path for conveying downlink signals at the first and second range of frequencies and including circuitry for rejecting signals at the second range of frequencies, the circuitry for rejecting being controllably switched into the first filtered path;
a first transmit section interconnecting the antenna to the RF/IF conversion circuitry for conveying uplink signals within the first range of frequencies, and including signal splitting circuitry;
a second transmit section connected to the antenna and connected to receive uplink signals from the signal splitting circuitry and including signal multiplication circuitry for increasing the frequency of signals received from the splitting circuitry to the uplink band of the second range of frequency; and
the receive section and first and second transmit sections sharing common mixers and IF processors.

15. A wireless radiotelephone mobile communications apparatus as claimed in claim 14, further comprising:
a duplex filter coupling the receive section and the first transmit section to the antenna.

16. A wireless radiotelephone mobile communications apparatus as claimed in claim 14, further comprising:
the signal multiplication circuitry multiplying by a factor of three.

17. A wireless radiotelephone mobile communications apparatus as claimed in claim 14, further comprising:
power control circuitry for controlling power amplification in the first and second transmit sections.

18. A wireless radiotelephone mobile communications apparatus as claimed in claim 14, further comprising:
the antenna having a length a quarter wavelength of the lower one of the first and second ranges of frequency.

* * * * *